(12) United States Patent
Schroeder et al.

(10) Patent No.: US 10,787,171 B2
(45) Date of Patent: Sep. 29, 2020

(54) METHOD FOR OPERATING A VEHICLE

(71) Applicant: Robert Bosch GmbH, Stuttgart (DE)

(72) Inventors: Christoph Schroeder, Sunnyvale, CA (US); Oliver Pink, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 16/084,885

(22) PCT Filed: Mar. 29, 2017

(86) PCT No.: PCT/EP2017/057357
§ 371 (c)(1),
(2) Date: Sep. 13, 2018

(87) PCT Pub. No.: WO2017/174408
PCT Pub. Date: Oct. 12, 2017

(65) Prior Publication Data
US 2019/0084562 A1 Mar. 21, 2019

(30) Foreign Application Priority Data
Apr. 7, 2016 (DE) .......................... 10 2016 205 761

(51) Int. Cl.
*B60W 30/08* (2012.01)
*B60W 30/095* (2012.01)
B60W 30/14 (2006.01)
(Continued)

(52) U.S. Cl.
CPC ........ *B60W 30/0956* (2013.01); *B60W 30/08* (2013.01); *B60W 30/10* (2013.01);
(Continued)

(58) Field of Classification Search
CPC .. B60W 30/0956; B60W 30/10; B60W 30/08; B60W 30/14; B60W 50/0205;
(Continued)

(56) References Cited

U.S. PATENT DOCUMENTS

2013/0054106 A1* 2/2013 Schmudderich .. B60W 30/0956
701/96
2015/0073662 A1* 3/2015 Schmudderich ......... B62D 6/00
701/41
(Continued)

FOREIGN PATENT DOCUMENTS

DE 10349631 A1 5/2005
DE 102007034196 A1 1/2009
(Continued)

OTHER PUBLICATIONS

English Translation: Gunzel, DE 102013209242 A1, Nov. 2014, German Patent Office Publication (Year: 2014).*
International Search Report dated Jul. 12, 2017 of the corresponding International Application PCT/EP2017/057357 filed Mar. 29, 2017.

*Primary Examiner* — Nadeem Odeh
(74) *Attorney, Agent, or Firm* — Norton Rose Fulbright US LLP; Gerard Messina

(57) ABSTRACT

A method for operating a vehicle includes detecting an object state using a surroundings sensor system of the vehicle at a first point in time, detecting an object state using the surroundings sensor system at a later second point in time, and adapting an activation state of a semi-automated or fully-automated driving function of the vehicle based on the detected object states.

12 Claims, 2 Drawing Sheets

(51) Int. Cl.
*B60W 30/10* (2006.01)
*B60W 40/04* (2006.01)
*B60W 40/105* (2012.01)
*B60W 50/00* (2006.01)
*B60W 50/02* (2012.01)

(52) U.S. Cl.
CPC ............ *B60W 30/14* (2013.01); *B60W 40/04* (2013.01); *B60W 40/105* (2013.01); *B60W 50/0097* (2013.01); *B60W 50/0205* (2013.01); *B60W 2540/00* (2013.01); *B60W 2554/00* (2020.02)

(58) Field of Classification Search
CPC ........... B60W 50/0097; B60W 40/105; B60W 40/04; B60W 2554/00; B60W 2540/00
USPC ................................... 701/117, 23
See application file for complete search history.

(56) References Cited

U.S. PATENT DOCUMENTS

| 2016/0117841 A1* | 4/2016 | Fukuman | G06K 9/685 |
| | | | 382/103 |
| 2016/0210521 A1* | 7/2016 | Traxler | G06K 9/03 |

FOREIGN PATENT DOCUMENTS

| DE | 102012215093 A1 | 2/2014 |
| DE | 102013209242 A1 | 11/2014 |
| EP | 2562060 B1 | 10/2014 |
| JP | 2010202030 A | 9/2010 |
| JP | 2011063131 A | 3/2011 |
| JP | 2011065338 A | 3/2011 |
| JP | 2015123899 A | 7/2015 |

* cited by examiner

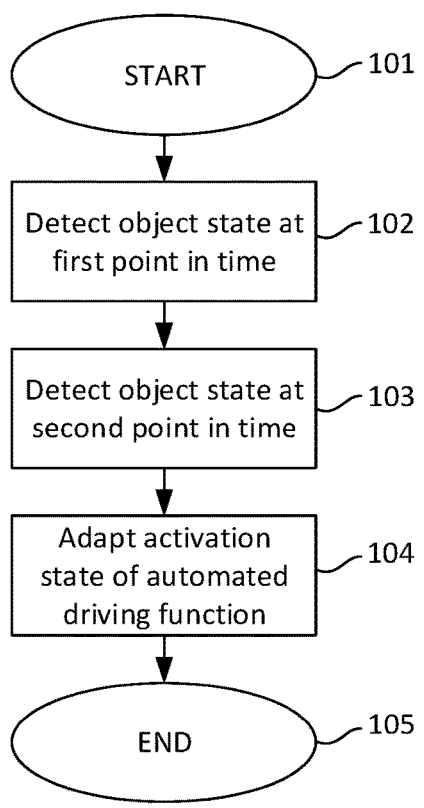
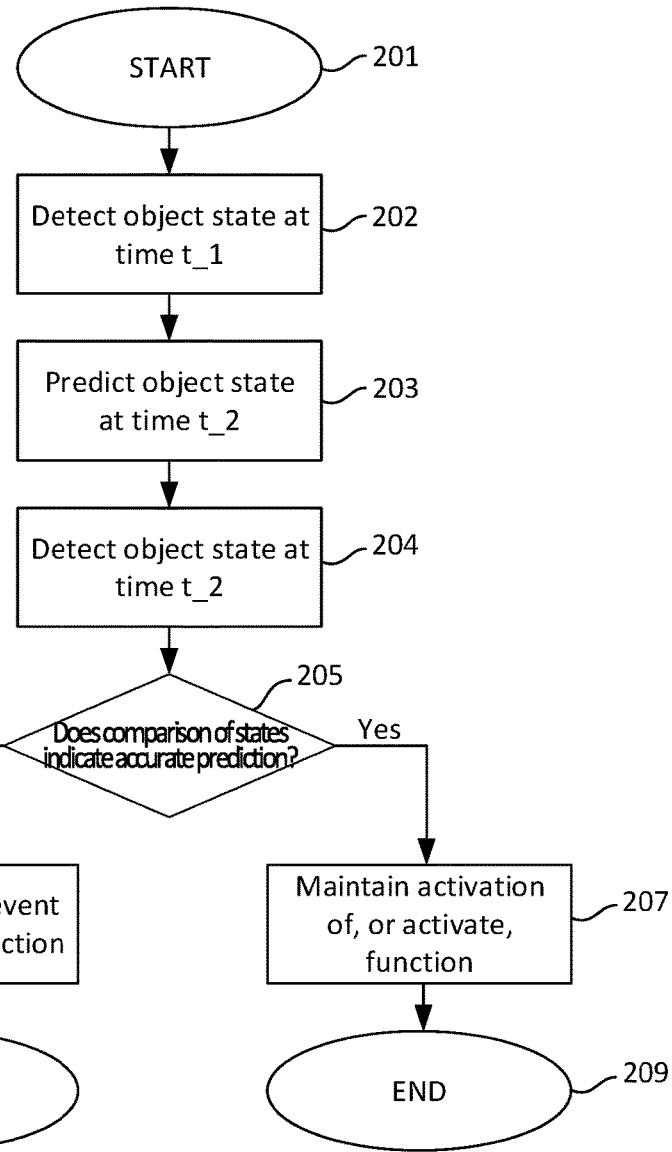
Fig. 1
Fig. 2

METHOD FOR OPERATING A VEHICLE

CROSS-REFERENCE TO RELATED APPLICATIONS

The present application is the national stage of International Pat. App. No. PCT/EP2017/057357 filed Mar. 29, 2017, and claims priority under 35 U.S.C. § 119 to DE 10 2016 205 761.8, filed in the Federal Republic of Germany on Apr. 7, 2016, the content of each of which are incorporated herein by reference in their entireties.

FIELD OF THE INVENTION

The present invention relates to a method for operating a vehicle.

BACKGROUND

Driver assistance functions for vehicles are known from the related art. The driver assistance functions can generally be activated or deactivated by a driver. EP 2 562 060 B1 describes a method for a computer-based prediction of movement patterns of at least one target object, such as a vehicle. DE 10 2012 215 093 A1 describes a method for operating a driver assistance system for a vehicle traveling on a roadway. In this case, a likely impact point with the traveling vehicle is ascertained as a function of a predicted trajectory of a vehicle in oncoming traffic and, possibly, a safety device is activated.

SUMMARY

The present invention describes a method for operating a vehicle. The vehicle includes a surroundings sensor system and at least one at least semi-automated driving function. With the aid of the surroundings sensor system, an object state is detected at at least one first point in time and at a later second point in time and an activation state of the driving function is adapted on the basis of the detected object states.

The method according to the present invention offers an advantage that the safety in road traffic is increased. With the aid of the detection of object states at different points in time, it can be established whether a driving function is capable of safely guiding the vehicle at a point in time of the detection. Due to the adaptation of the activation state, a situation in which a driving function is utilized outside ranges in which the driving function does not have the full functional capability and cannot ensure a certain safety level can be avoided.

The surroundings sensor system can include common sensors such as cameras, LIDAR, radar, or ultrasonic sensors or appropriate sensor systems. The at least semi-automated driving function can be, for example, systems for driver assistance or for the automated guidance of the vehicle up to systems for highly automated or even autonomous travel. Such systems include, for example, lane departure warning systems, adaptive cruise control, traffic jam assistants including transverse and/or longitudinal guidance, or systems for the at least intermittent complete takeover of the vehicle guidance. A driving function can also be one that implements a single maneuver or that achieves a particular driving state.

The detected object states can be understood to be all conceivable properties of detected objects, all surroundings details or objects which are detectable with the aid of the surroundings sensor system being referred to as objects. These include, for example, further road users, vehicles, vehicle occupants or vehicle drivers, road markings, other markings, landmarks, such as trees or signs, or infrastructure features such as tunnels, construction sites, or guardrails. The properties of the objects can include, in this case, for example, the position, size, speed, distance, color, movement direction, structure, and/or further details.

In one advantageous example embodiment of the method, a prediction of at least one object state at a later point in time takes place with the aid of the object state detected at the first and/or second point in time. The adaptation of the activation state takes place on the basis of the at least one predicted object state.

This example embodiment offers the advantage that an object state which was calculated based on an assessment of the object behavior in surroundings of the vehicle is incorporated in the adaptation of the activation state. The extent to which the activation state should be adapted can therefore be evaluated as a function of the assessment.

The prediction can take place, in this case, with reference to an object model which can be stored in the vehicle. If, for example, the speed, the direction of travel, and the present position of an object are detected, and if the speed and position of the vehicle are taken into account, the position of the object can be predicted for a later point in time, for example, assuming a constant direction of travel and speed. It is also conceivable that different object models are stored for different object classes such as further vehicles, motorcycles, cyclists, pedestrians, or fixedly installed, immobile infrastructure features. The classification of the objects can take place with the aid of known classification methods, for example, with the aid of detected camera images. Different predictions can therefore take place depending on the assigned object class.

In one advantageous example embodiment of the method, the adaptation of the activation state of the driving function takes place based on a comparison of at least two predicted object states and/or at least one object state predicted for a later point in time and one object state detected at that later point in time.

This example embodiment of the method offers the advantage that the adaptation of the activation state can take place on the basis of a comparison of an assessment of the object behavior in surroundings of the vehicle with one further assessment at a later point in time or with the detected object state at a later point in time. As a result, it is possible to validate the assessment with the aid of at least partially independent object states at one point in time and to adapt the activation state as a function of the comparison of the object states.

In one advantageous example embodiment of the method, a quality of at least one predicted object state is ascertained and the activation state is adapted based on the quality.

This example embodiment of the method offers the advantage that the activation state is adapted on the basis of the accuracy of the prediction and, therefore, the capability of the vehicle to assess the surroundings.

In one advantageous example embodiment of the method, the quality is evaluated as being too low when the quality is below a threshold value for the quality. Consequently, in the case of a quality below the threshold value, the at least one at least semi-automated driving function is deactivated or an activation of the driving function is prevented.

This example embodiment of the method offers the advantage that safety is increased. If the prediction of the predicted object state is too inaccurate, for example, if the predictions of object states detected at different points in time deviate from each other by too great an extent, this is a sign that the object behavior in the surroundings of the vehicle cannot be assessed sufficiently well by the vehicle. Consequently, the driving function is deactivated if it was active at the point in time of the ascertainment of the quality. The deactivation can take place directly after the ascertainment, with delay, or in steps, for example by way of defined fallback supports which can contain a speed reduction or an automated stop or the attainment of a safe state. An appropriate warning can also be output to the driver and the driver can be prompted to take over the vehicle control. If the driving function is not active at the point in time of the ascertainment of the insufficient quality, an activation of the driving function is prevented. The switch-on function of the driving function or a corresponding switch, for example, is deactivated for this purpose. The limitation of the driving function can also be displayed to the driver, for example, in the form of illuminated icons in the dashboard.

In one advantageous example embodiment of the method, a mean deviation of at least two predicted object states at the second point in time and/or at least one predicted object state and the object state detected at the second point in time are/is determined as a measure of the quality.

This example embodiment offers the advantage that the quality of at least one predicted object state can be ascertained very rapidly and very easily and, consequently, a rapid adaptation of the activation state of the driving function can take place.

In order to ascertain the quality, either at least two object states at one common later point in time, which have been predicted on the basis of object states detected at different points in time, or at least one object state at a second point in time, which has been predicted on the basis of an object state detected at a first point in time, can be utilized with the object state detected at the second point in time. The ascertainment can always be carried out at the point in time of the second detection, regardless of whether the object state detected at the second point in time or an object state predicted with the aid of the object state detected at the second point in time is utilized for ascertaining the quality.

All aforementioned object states and properties can be utilized for determining the mean deviation. For example, distances of the predicted or detected object positions, deviations in the object speeds, deviations of the object shape or the movement direction of the object or the object color (illumination, entry into a tunnel, etc.).

Instead of calculating the mean deviation of the predicted or detected object states, a determination of the variance or a formation of the sum of the distances is also conceivable. The smaller the deviations/sum, the better is the quality of the prediction.

In one advantageous example embodiment of the method, during the adaptation of the activation state, the driving function is deactivated or the driving function remains activatable, or the driving function continues to remain active or an activation of the driving function is prevented.

This example embodiment offers the advantage that the driving function can be carried out or is carried out only when the assessment of the object states in the surroundings of the vehicle is possible with sufficiently high accuracy. Consequently, an activation of the driving function is prevented when the safe implementation of the driving function is not ensured. If the driving function has already been activated, the vehicle control is returned to a driver or an appropriate safety maneuver is carried out in order to increase the safety of all road users. Since a driving function can also be understood to be a single maneuver implementable by the driving function or a driving state achievable with the aid of the driving function, an adaptation of the driving function can also mean a limitation of the driving function. For example, that a maximum speed can not be exceeded with the aid of the driving function.

An example embodiment of the present invention is directed to an electronic control unit configured for carrying out all steps of the method described in this application, an example embodiment is directed to a corresponding computer program, and an example embodiment is directed to a machine-readable memory medium on which the computer program is stored.

BRIEF DESCRIPTION OF THE DRAWINGS

FIG. 1 is a flowchart that illustrates a method according to an example embodiment of the present invention.

FIG. 2 is another flowchart of a method according to an example embodiment of the present invention.

DETAILED DESCRIPTION

Figure 3:
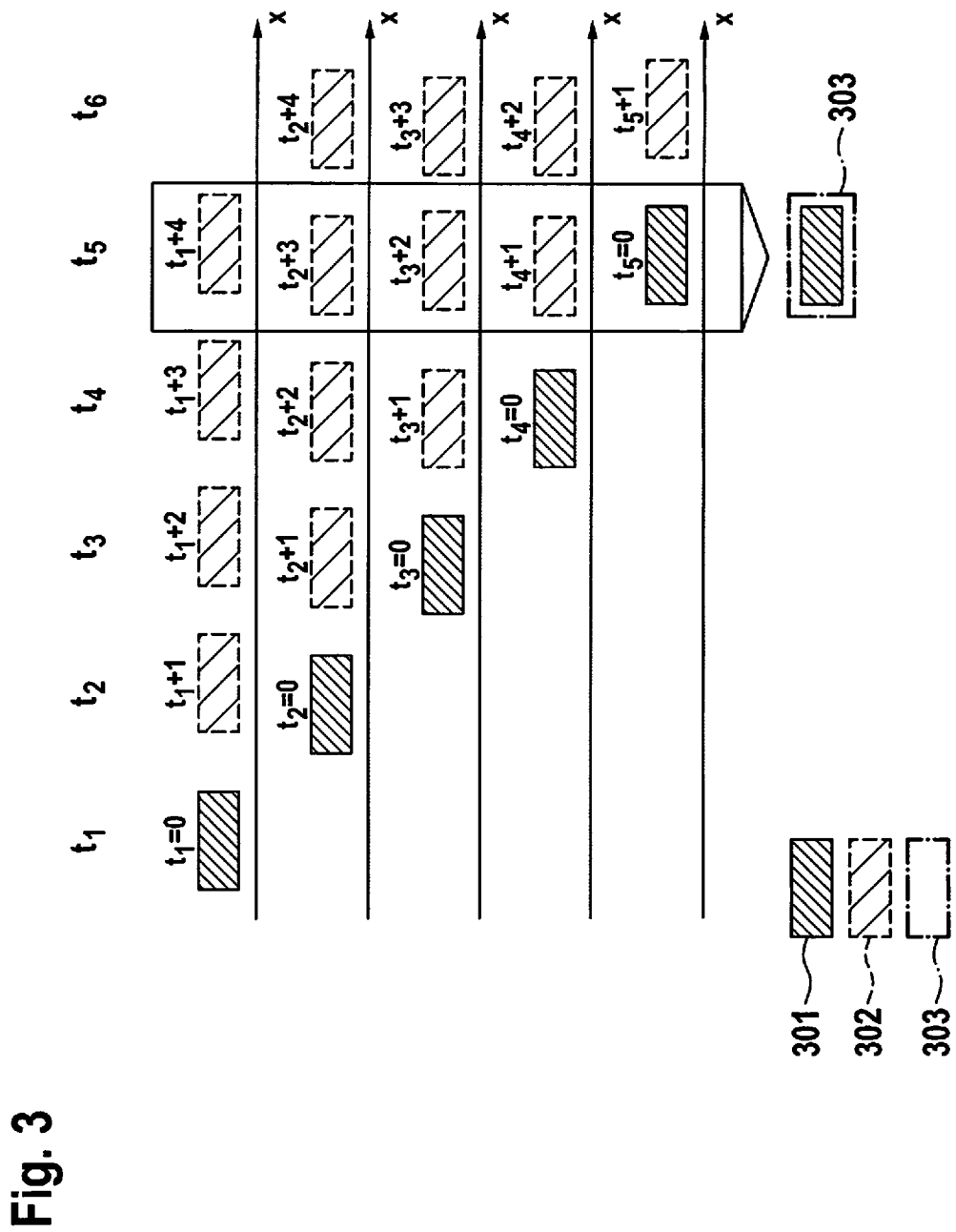
FIG. 3 is a diagram that illustrates object states at different points in time, according to an example embodiment of the present invention.

FIG. 1 illustrates a method for operating a vehicle according to an example embodiment of the present invention. The vehicle is equipped with a surroundings sensor system, at least one at least semi-automated driving function, and a control unit for adapting an activation state of the driving function. The method can be carried out on a separate control unit, as in this example, although alternatively, the method is also integratable into the driving function and into the corresponding control unit. The method starts in step 101.

In step 102, an object state is detected with the aid of the surroundings sensor system at a first point in time. In this example, the position, direction of travel, and speed of one further vehicle.

In step 103, one further object state is detected at a later second point in time. In this case, the position, direction of travel, and speed of one further vehicle again.

In step 104, an activation state of the at least one at least semi-automated driving function is adapted with the aid of the control unit based on the detected object states. For this purpose, the at least two object states are evaluated, for example, stored and subsequently compared, with the aid of the control unit.

The driving function can be, for example, a passing assistance system which can initiate and carry out passing maneuvers on two-lane roads in an automated manner, for example, at the touch of a button. If it is established in step 104 during an evaluation of the detected object states, for example, that a detected passing further vehicle has such a high speed that a safe execution of a passing maneuver on the presently traveled route section with the aid of the driving function does not appear to be safe, for example, since the surroundings sensor system does not have an appropriately large detection range, an activation of this driving function is prevented. The button for activating the driving function can be deactivated for this purpose, for example. In addition, the fact that the function is not activatable due to the present traffic situation can be displayed to the driver. The method ends in step 105.

FIG. 2 shows another method that can be carried out on the same vehicle. The method starts in step 201. In step 202, at least one object state is detected at a first point in time t_1.

The detected object can be, for example, a cyclist whose object states, position, speed, and viewing direction are detected at point in time t_1.

In step 203, at least one object state of the detected object at a later second point in time t_2 is predicted with the aid of the control unit. In this example, the position and the speed of the driver at point in time t_2. All object states detected at point in time t_1, can be, but not necessarily, predicted at a later point in time. For example, it is also conceivable that only a prediction of the position of the cyclist at point in time t_2 is carried out or all three states are predicted on the basis of the position, speed, and viewing direction of the cyclist.

In step 204, an object state of the same object is detected again at the later second point in time t_2. In this example, once again, the position, speed, and viewing direction of the driver.

In step 205, the object states which were detected at second point in time t_2 are compared, with the aid of the control unit, with the object states which were predicted for point in time t_2 on the basis of the object states at point in time t_1. For example, a quality of the prediction can be ascertained with the aid of the comparison. In order to ascertain the quality, the distance, for example, of a predicted object state or a mean deviation of all predicted object states for point in time t_2 can be calculated for the object state/object states actually detected at point in time t_2. Instead of calculating the mean deviation of the object states, a determination of the variance or a formation of the sum of the distances is also conceivable. The smaller the deviations, the better is the quality of the prediction.

Based on the comparison of the object states carried out, a decision is reached regarding the adaptation of the activation state of the at least one driving function. If the ascertained quality falls below a predefined limiting value, for example, if the mean deviation is greater than a predefined threshold value, this can indicate that the vehicle might not be capable of sufficiently accurately predicting and, therefore, evaluating the present traffic situation. The quality can be considered to be, for example, a measure of the complexity of a certain traffic situation which is to be coped with by the function. Since the sensors utilized for detecting the object states can also be utilized for the driving function, and are also utilized in this example, there is a direct correlation between the quality and the functional capability of the driving function.

If the quality ascertained in step 205 falls below a predefined threshold value, the method continues in step 206, in which an adaptation of the activation state of the driving function takes place. If the driving function is active at point in time t_2 and/or at the point in time of the ascertainment of the prediction quality, a deactivation of the function takes place. This can take place directly or with an adapted delay. For example, the driver could be initially informed that the driver must take over the vehicle guidance. Alternatively, the vehicle can also operate with the aid of implemented fallback supports, so that successive individual driving functions are deactivated or properties of the driving function are limited. For example, a reduction of the speed or an approach to a safe stopping area could take place.

If the driving function is not activated at point in time t_2 or at the point in time of the ascertainment of the insufficient quality, an adaptation of the activation state of the driving function takes place in step 206 in the form of a prevention of the activation of the driving function. This can take place, for example, by way of the activation function being deactivated, so that a corresponding switch is no longer actuatable or its actuation does not effectuate an activation of the driving function. Simultaneously, the information that the activation of the driving function is not presently possible can be displayed to the driver.

In the event of insufficient quality, the method ends in step 208 and can be subsequently restarted in step 201. Alternatively, object states can also be permanently detected and, based on the detected object states, predicted object states at later points in time can be determined, which are compared with each other or with object states detected at later points in time.

If the quality ascertained in step 205 does not fall below the predefined threshold value, a traffic situation is present which is easy for the particular driving function to handle. In this case, the method continues in step 207, in which an adaptation of the activation state of the driving function takes place. If the driving function is already active, the activation state is confirmed by way of the adaptation and the driving function remains active. In this case, an adaptation can therefore also be understood to mean that nothing about the state of the driving function changes and no change is necessary.

If the driving function is not activated at point in time t_2 or at the point in time of the ascertainment of the quality, an adaptation of the activation state of the driving function takes place in step 206 in the form of a release of the activatability of the driving function. If the driving function was not activatable before point in time t_2 or the point in time of the ascertainment of the quality, the activation state is set to activatable and the driving function can be activated. If the driving function was already activatable, nothing about the activation state changes and the driving function continues to remain activatable.

In this case, the method ends in step 209 and can subsequently start over again.

FIG. 3 shows one exemplary representation of the detection and prediction of object states. In this example, object positions 301 are detected and object positions 302 are predicted, as object states. Object positions 301 are detected with the aid of the surroundings sensor system at different points in time t_1 through t_6. For every object position 301 detected at a point in time t_x, $x \in \mathbb{N}$, multiple object positions 302 are predicted for later points in time t_x+i, $i \in \mathbb{N}$. These object positions 302 can be compared, at an arbitrary point in time t_y, $y \in \mathbb{N}$, with further predicted object positions 302 and/or object position 301 actually detected at the corresponding point in time.

In an example, the predicted object positions 302 can also be compared or in an example, only the predicted object states 302 are compared. A detected object position 301 (a detected object state) does not necessarily have to be present. If, for example, an object state predicted for point in time t_3 on the basis of the object state detected at point in time t_1 differs too greatly from an object state predicted for point in time t_3 on the basis of the object state detected at point in time t_2, an adaptation of the activation state of the driving function can take place even before point in time t_3. In this case, the object state actually detected at point in time t_3 is therefore not incorporated into the adaptation.

A comparison of object states can take place at an arbitrary point in time t_x, $x \in \mathbb{N}$. In FIG. 3, for example, detected 301 and predicted 302 object positions (plotted along an x-axis) are compared and a deviation 303 of predicted object positions 302 from actually detected object position 301 is determined as the quality of the prediction.

What is claimed is:

1. A method for operating a vehicle, the method comprising:
   using a surroundings sensor system of the vehicle, detecting an object state at a first point in time;
   in a first determination of the object state at a second point in time that is after the first point in time, obtaining a first version of the object state at the second point in time by predicting what the object state will be at the second point in time based on the detected object state at the first point in time;
   in a second determination of the object state at the second point in time, obtaining a second version of the object state at the second point in time;
   comparing the first version of the object state at the second point in time to the second version of the object state at the second point in time; and
   based on a result of the comparison of the first version of the object state at the second point in time and the second version of the object state at the second point in time, adapting an activation state of a semi-automated driving function of the vehicle or a fully-automated driving function of the vehicle;
   wherein:
   (a) the second determination of the object state at the second point in time is performed by (1) detecting the object state at a third point in time that is between the first point in time and the second point in time and (2) based on the detected object state at the third point in time, predicting the object state at the second point in time as the second version of the object state at the second point in time; or
   (b) the method further includes, based on the result of the comparison, determining an accuracy of operation of the surroundings sensor system, the adapting being performed based on the determined accuracy.

2. The method of claim 1, wherein the comparing includes ascertaining a mean deviation.

3. The method of claim 1, further comprising determining, based on the result of the comparison, whether the semi-automated driving function of the vehicle or the fully-automated driving function of the vehicle is to be deactivated, remain activatable, continue to remain active, or be prevented from being activated, wherein the adapting is performed based on a result of the determining.

4. The method of claim 1, wherein the second determination of the object state at the second point in time is performed by (1) the detecting of the object state at the third point in time that is between the first and second points in time and (2) based on the detected object state at the third point in time, predicting the object state at the second point in time as the second version of the object state at the second point in time.

5. The method of claim 4, further comprising ascertaining a characteristic of the surroundings sensor system based on the result of the comparison, wherein the adapting is performed based on the ascertained characteristic.

6. The method of claim 4, further comprising ascertaining an accuracy of the surroundings sensor system based on the result of the comparison, wherein the adapting is performed based on the ascertained accuracy.

7. The method of claim 6, further comprising determining that the ascertained accuracy is below a predefined threshold, wherein the adapting includes deactivating or preventing activation of the semi-automated driving function of the vehicle or the fully-automated driving function of the vehicle in response to the determination that the ascertained accuracy is below the predefined threshold.

8. The method of claim 1, wherein:
   the method further includes, based on the result of the comparison, determining the accuracy of operation of the surroundings sensor system; and
   the adapting is performed based on the determined accuracy.

9. The method of claim 8, further comprising determining that the determined accuracy is below a predefined threshold, wherein the adapting includes deactivating or preventing activation of the driving function in response to the determination that the determined accuracy is below the predefined threshold.

10. The method of claim 8, wherein the second determination of the object state at the second point in time is performed by detecting the object state at the second point in time as the second version of the object state at the second point in time.

11. An electronic unit comprising a processor that is programmed to execute a method for operating a vehicle, the method comprising:
   using a surroundings sensor system of the vehicle, detecting an object state at a first point in time;
   in a first determination of the object state at a second point in time that is after the first point in time, obtaining a first version of the object state at the second point in time by predicting what the object state will be at the second point in time based on the detected object state at the first point in time;
   in a second determination of the object state at the second point in time, obtaining a second version of the object state at the second point in time;
   comparing the first version of the object state at the second point in time to the second version of the object state at the second point in time; and
   based on a result of the comparison of the first version of the object state at the second point in time and the second version of the object state at the second point in time, adapting an activation state of a semi-automated driving function of the vehicle or a fully-automated driving function of the vehicle;
   wherein:
   (a) the second determination of the object state at the second point in time is performed by (1) detecting the object state at a third point in time that is between the first point in time and the second point in time and (2) based on the detected object state at the third point in time, predicting the object state at the second point in time as the second version of the object state at the second point in time; or
   (b) the method further includes, based on the result of the comparison, determining an accuracy of operation of the surroundings sensor system, the adapting being performed based on the determined accuracy.

12. A non-transitory computer-readable medium on which are stored instructions that are executable by a processor and that, when executed by the processor, cause the processor to perform a method for operating a vehicle, the method comprising:
   using a surroundings sensor system of the vehicle, detecting an object state at a first point in time;
   in a first determination of the object state at a second point in time that is after the first point in time, obtaining a first version of the object state at the second point in time by predicting what the object state will be at the second point in time based on the detected object state at the first point in time;

in a second determination of the object state at the second point in time, obtaining a second version of the object state at the second point in time;

comparing the first version of the object state at the second point in time to the second version of the object state at the second point in time; and based on a result of the comparison of the first version of the object state at the second point in time and the second version of the object state at the second point in time, adapting an activation state of a semi-automated driving function of the vehicle or a fully-automated driving function of the vehicle;

wherein:
(a) the second determination of the object state at the second point in time is performed by (1) detecting the object state at a third point in time that is between the first point in time and the second point in time and (2) based on the detected object state at the third point in time, predicting the object state at the second point in time as the second version of the object state at the second point in time; or
(b) the method further includes, based on the result of the comparison, determining an accuracy of operation of the surroundings sensor system, the adapting being performed based on the determined accuracy.

* * * * *